March 4, 1952  D. G. DEBO  2,587,704
TANGENTIAL CYLINDER VALVE
Filed Nov. 29, 1947  3 Sheets-Sheet 1

INVENTOR.
Delmer G. Debo
BY
Donald E. Payne
ATTORNEY

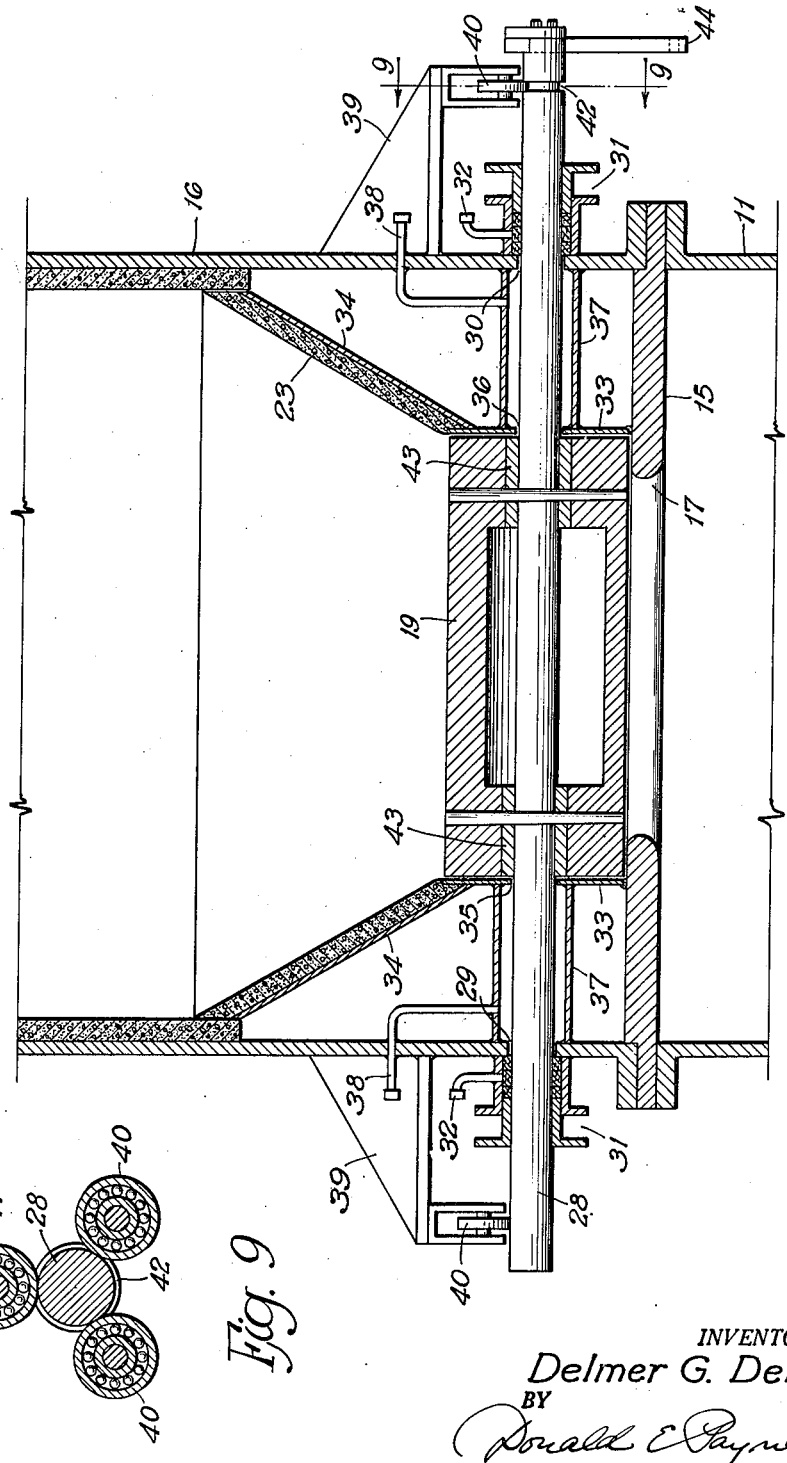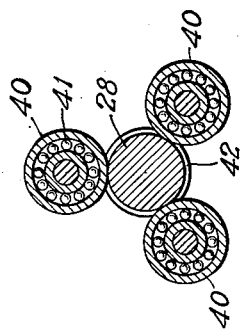

March 4, 1952 D. G. DEBO 2,587,704
TANGENTIAL CYLINDER VALVE
Filed Nov. 29, 1947 3 Sheets-Sheet 3

INVENTOR.
Delmer G. Debo
BY
ATTORNEY

Patented Mar. 4, 1952

2,587,704

UNITED STATES PATENT OFFICE 2,587,704

TANGENTIAL CYLINDER VALVE

Delmer G. Debo, Chicago, Ill., assignor to Standard Oil Company, Chicago, Ill., a corporation of Indiana Application November 29, 1947, Serial No. 788,849

7 Claims. (Cl. 137—69)

This invention relates to an improved valve and it pertains more particularly to a valve structure for throttling the flow of fluids containing suspended abrasive solids.

In processes for handling finely divided abrasive solids in fluid suspension a serious erosion problem is presented when it is necessary to throttle the flow of the fluid, particularly when it is desired to throttle to a lower pressure while maintaining a substantially constant back pressure. Such a problem is presented, for example, in the throttling of the flue gases containing entrained catalyst particles from the top of a regenerator in a fluid type catalytic cracking system. In a fluid catalytic cracking system designed to process about 20,000 barrels per day of gas oil charging stock and employing a synthetic silica alumina, silica magnesia or clay-type catalyst of small particle size, the catalyst is transferred from a low point in the reactor to the regenerator and from a low point in the regenerator back to the reactor by utilizing the static head of fluidized catalyst in standpipes supplemented by the pressure above the standpipe inlet to obtain the pressure differential required for effecting such transfer. Since the pressure differential for obtaining solids transfer is dependent in part on the pressure above the standpipe it is desirable to maintain a substantially constant pressure in the upper part of the reactor and regenerator respectively.

The regeneration gases after passing through a number of cyclone separators are discharged from the top of the regenerator vessel through a pipe about 6 feet in diameter which may discharge to the atmosphere. The amount of flue gas and steam thus vented to the atmosphere may be of the order of 200,000 to 300,000 pounds per hour and the entrained solids in said gases may amount to about 300 to 600 pounds or more per hour. The gas velocity in the regenerated flue gas outlet pipe may thus be of the order of about 100 feet per second. An object of my invention is to provide a throttling valve for said regenerator outlet pipe which will withstand the severe erosion conditions for a long period of time and which will effectively maintain a substantially constant back pressure in the regenerator. A further object is to provide a valve whose effectiveness is not destroyed by severe erosion and which can be used for a much longer period of time without repair or replacement than any other valve heretofore known to the art. The repair or replacement of such a valve requires that the entire catalytic cracking unit be shut down and this involves enormous expense and loss of production as well as the expense of the valve mechanism per se. An important object of the invention is to produce a valve which will withstand the severe abrasion and erosion to such an extent that the cracking unit will not have to be shut down for repair or replacement of said valve.

A further object of the invention is to provide a method and means for deadening or eliminating the noise of venting flue gases from a regenerator outlet pipe. Such noise is apparently generated by the passage of gases at high velocity over relatively sharp surfaces and the noise from a regenerator outlet in a 20,000 barrel per day cracking unit has constituted a serious problem. Many methods have been employed to eliminate this noise but heretofore they have been unsuccessful.

A further object is to provide improved methods and means for installing valves so that they are readily accessible for repair or replacement and so that such repair or replacement may be effected with a minimum of time and effort.

While the invention is primarily directed toward the solution of a serious problem in connection with the venting of flue gases from catalytic cracking regenerators, an object of the invention is to provide a type of valve structure which will be generally useful for throttling or controlling the flow of fluids particularly when said fluids contain erosive solids. Other objects will be apparent from the following description.

The valve structure of the present invention may be briefly characterized as a pair of rotatable segmented cylinders mounted to rotate on parallel axes spaced from each other so that the segmented portions of the cylinders will form an opening therebetween when the cylinders are in one position and so that said opening may be controlled and/or closed by rotating the cylinders to another position, the back side and ends of the cylinders being constantly sealed in all operative positions of the rotatable cylinders. As the fluid enters and passes through the opening between the segmented cylinders the high velocity stream does not pass over any sharp edges and thus both erosion and noise are minimized. The severest erosion usually takes place on the upstream (lower) side of the valve although some erosion of course takes place in the valve throat and on the downstream side. When a portion of the cylindrical surfaces becomes eroded, the cylinders may simply be rotated a little further to present fresh surfaces and to provide an opening of substantially the same cross sectional area regardless of erosion. By making the valve surfaces of a hard metal such as carbon steel or hard metal alloy and by providing increased thickness in the cylinder walls which are subjected to severest erosion, a relatively light weight valve of extremely long life may be produced. The valve may be employed as a shutoff valve by rotating the cylinders until the unsegmented portions bear against each other. By mounting the shafts which support the cylinders on antifriction supports and providing a link-lever system for simultaneously rotating the cylinders in opposite directions, the pressure drop through the valve may be controlled with great ease and precision and a substantially constant back pressure may be maintained on the upstream side.

The invention will be more clearly understood from the following detailed description of a specific example thereof read in conjunction with the accompanying drawings which form a part of this specification wherein similar parts are designated by like reference characters in several views and wherein:

Figure 5 is a vertical section of the valve structure taken along the lines 5—5 of Figure 1;

Figure 9 is a detail of the bearing arrangement taken along lines 9—9 of Figure 5.

Figure 1:
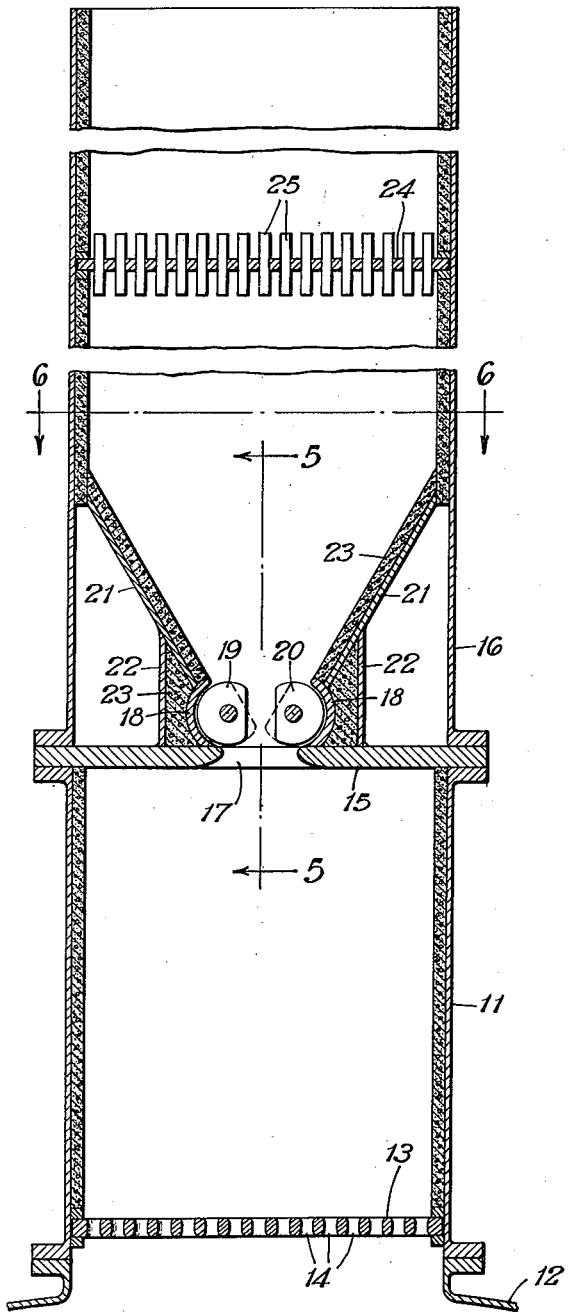
Figure 1 is a schematic vertical section through a regenerator flue gas outlet pipe illustrating the position and operation of the valve structure.

The invention will be described in connection with the venting of flue gas from the regenerator outlet in a 20,000 barrel per day fluid type catalytic cracking plant but it should be understood that such description is by way of example and that the invention is applicable generally to the control of fluid flow and particularly to the throttling of fluids which contain erosive solids suspended therein. The fluid catalytic cracking regenerator vessel may be about 37 feet in diameter and about 40 feet in height. In the upper part of the vessel there are usually several stages of cyclone separation, the cyclones of the last stage discharging gases into a walled-off portion at the top of the vessel. A pipe section 11 is secured to the top of regenerator vessel 12. At the base of pipe section 11 a perforated distributor plate 13 is interposed which plate may be about two inches thick and which is provided with a multitude of holes 14 about one inch in diameter spaced at two or three inches centers and rounded on the lower edges. The purpose of this perforated plate is to provide a pressure drop of approximately 1 p. s. i., to provide even distribution across the entire cross-sectional area of the upflowing stream toward the valve inlet and to avoid erosion of the vessel and/or pipe at this point in the system. If desired, replaceable ferrules, i. e. short pipe sections about one inch in diameter and four or five inches long may be used instead of simple holes.

A 3-inch base plate 15 is secured between the upper flanged ends of pipe section 11 and the lower flanged ends of pipe section 16. Base plate 15 is provided with a rectangular central opening 17 which may be about 24 inches wide and about 48 inches long, the inner edges of the plate being rounded particularly along the 48-inch side of the opening. Arcuate shaped steel plates 18 about 1 inch in thickness are welded to the upper side of base plate 15 along the 48-inch sides of opening 17, to form seals for valve rotors or cylinders 19 and 20 as will hereinafter be described.

Inclined steel plates 21 are welded to the upper part (about 1 inch below the top) of arcuate plates 18 and they extend upwardly at an angle of about 60 degrees to the outer walls of pipe 16. Vertical steel plates 22 are welded to base plate 15 and inclined plates 21 to provide necessary strength and also to provide a chamber which may be sealed with relatively light weight high temperature cement 23 (such as Gunnite, Lumnite, etc.) prepared from a light weight refractory material such as kieselguhr or Alundum admixed with a mortar which, on setting, will withstand high temperatures of the order of 1000° F. The same type of refractory cement may be sprayed or otherwise applied on the inner sides of pipe sections 11, 16, etc. and on the upper side of inclined plate 21 and the corresponding inclined plates at the ends of rotors 19 and 20, such high temperature cement or mortar being smoothed on to provide rounded surfaces for minimizing noise and erosive wear. The high temperature cement in the space between arcuate member 18 and plate 22 adds additional protection since it avoids the necessity of shutdown for repair even though a hole be eroded through plate 21 immediately above the valve. The high temperature cement has a sound adsorbing or deadening effect in addition to its function of protecting metal surfaces against erosion.

About two or three pipe diameters above base plate 15 another plate 24 is interposed, this plate containing a multitude of openings (like openings 14) or replaceable ferrules 25 of about the same size and spacing as openings 14 in plate 13. Still further plates with openings or ferrules may be employed in still higher parts of the regenerator outlet pipe for minimizing the amount of pressure drop which must be taken across the valve itself.

Figure 7:
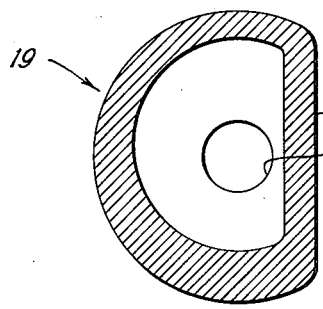
Figure 7 is transverse cross-section of one of the segmented cylinders.
Figure 8:
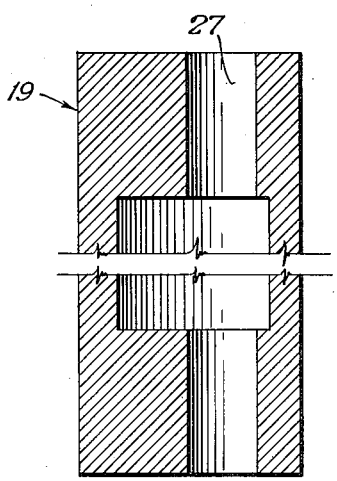
Figure 8 is a horizontal section through one of the segmented cylinders.

Rotatably mounted above opening 17 in base plate 15 are rotors which may be described as deformed, segmented or flattened cylinders 19 and 20, the specific structure of which is illustrated in Figures 7 and 8. To minimize weight and material these rotors or deformed cylinders are preferably hollow castings of hard metal such as carbon steel or a hard metal alloy of iron, nickel, chromium, molybdenum, tungsten, silicon, etc. with small amounts of carbon. In this specific example the deformed cylinders are 18 inches in outside diameter and 42 inches long, the hollow section extending to within about 9 inches of each end. The hollow section may be about 13½ inches in diameter, the center about ¾ inch higher than the center of the cylinders so that the thickness of the cylinder at the top will be about 1½ inch and the thickness at the bottom will be about 3 inches. The cylinder is deformed or segmented by having a flattened surface 26 about 5 inches from the center of the cylinder, the wall thickness of this side of the hollow cylinder being about 2 inches. The ends of the cylinder are provided with central openings 27 about 4½ inches in diameter. If desired, a pipe of noncorrosive metal may extend throughout the length of the cylinder said pipe fitting snugly in openings 27 and having an internal diameter of about 4 inches so that it may be easily slid onto and off of a supporting shaft. When such a pipe extends throughout the length of the cylinder the hollow space between the pipe and the cylinder walls may be filled with light weight high temperature cement.

While surface 26 on the rotor or deformed cylinder is in a single plane in the example herein described, it should be understood that the expression "flattened cylinder" is intended to mean any deformation of the cylinder by having at least one side thereof closer to the center than other sides thereof. In other words, face 26 may be slightly convex but less than 9 inches from the center. The cylinder may of course be solid and one side thereof be cut away. If the cylinders are mounted further apart than the sum of their radii, the deformed portion may actually protrude outwardly. Any such deviation from a true cylindrical surface is herein referred to by expressions such as "deformed" and "flattened" and when at the point of deformation the surface is closer to the center than the main cylinder wall, the expression "segmented" is intended to have the same significance as "flattened."

The structural mounting of the rotors or deformed cylinders is most clearly illustrated in Figure 5. A 4-inch alloy steel shaft 28 extends through openings 29 and 30 in the 6-foot internal diameter pipe section 16, each opening being provided with a packing gland 31 and a grease connection 32 for introducing lubricant into the packing material. Vertical plates 33 are welded to base plate 16 at each end of the rotors or deformed cylinders to provide a seal therefor and inclined plates 34 extend at an angle of about 60 degrees from the upper part of plates 13 to the walls of pipe 17, plates 34 corresponding to plates 21 and cooperating therewith to form a hopper-shaped path for fluids discharged from the valve. Plates 34 like plates 21 may be provided with coating of high temperature cement about 1-inch thick. Plate 33 has openings 35 and 36 for shaft 28 and pipe section 37 may be interposed between openings 29 and 35 and 30 and 36 respectively with bleed connections 38 for introducing steam or other gas at somewhat higher pressure than the flue gases. This bleed gas introduction is for the purpose of preventing solids from entering any crevices in the system and thus coming in contact with shaft 28.

The outer ends of shaft 28 are supported by antifriction elements carried by brackets 39 which may be spaced at 120 degree angles as illustrated in Figure 9. Each bracket carries a supporting or positioning wheel 40 which turns on ball-bearings 41. A thrust groove 42 may be provided at one end of the shaft and the rollers 40 at that end may extend into the thrust groove, the positioning of such roller supports on their brackets 39 tending to position the shaft and prevent longitudinal movement thereof.

The rotors or deformed cylinders may be provided with sleeves 43 of noncorrodable metal which may slide freely over the shaft and the rotors are mounted by simply holding them in place and sliding the shaft through openings 36, then through sleeves 43 and then through openings 35 and 29. Relative rotation between shaft 28 and the rotors or deformed cylinders may be prevented by keying the shaft to the rotor or by the use of set screws or tapered pins extending through the rotor or deformed cylinder and against or into the shaft. In this particular case the shaft centers are about 9 inches above base plate 15 and 9 inches from the center of pipe 16.

Figure 2:
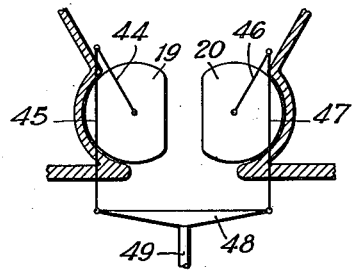
Figure 2 is a schematic detail illustrating the valve in wide open position.
Figure 3:
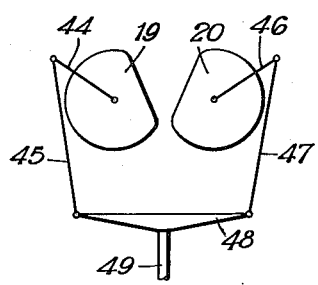
Figure 3 is a similar schematic detail illustrating the valve in normal operating position.
Figure 4:
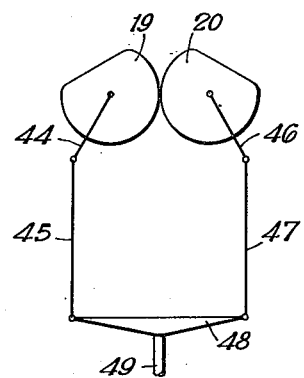
Figure 4 is a schematic detail illustrating the valve in ultimate closed position.
Figure 6:
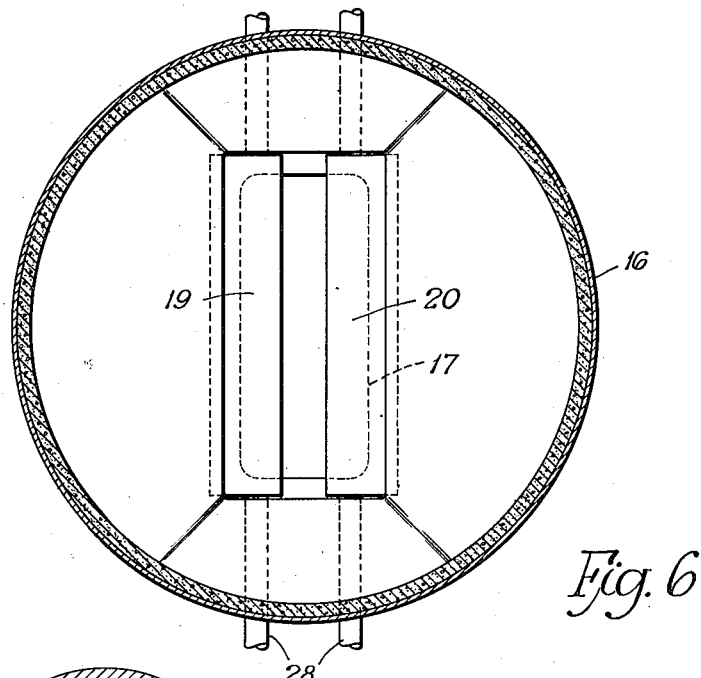
Figure 6 is a horizontal section taken along the lines 6—6 of Figure 1.

In operation the rotors or deformed, flattened or segmented cylinders are operated by rotation thereof in opposite directions. Such rotation may be effected by any conventional driving means operated by manual, mechanical, pneumatic, hydraulic or electrical devices. A preferred operating structure comprises a pneumatic or hydraulic system operating through links and levers as illustrated in Figures 2, 3 and 4. The outer end of shaft 28 is keyed or otherwise secured to operating lever 44 which in this case may be about 13½ inches in length and which is pivotally connected to link 45 which is about 30 inches in length. Similarly, the shaft which supports rotor or deformed cylinder 20 is keyed or otherwise secured to lever 46 which is pivotally connected to link 47, the last-named elements corresponding in length to lever 44 and link 45 respectively. The lower ends of links 45 and 47 are pivotally connected to bar 48 which is about 32 inches in length and which in turn is actuated by a hydraulically operated piston rod 49. This piston rod may be actuated by a fluid which is directly or indirectly actuated by the fluid pressure in the upper part of the regenerator vessel itself whereby any increase in regenerator pressure automatically elevates piston rod 49 thus causing an opening of the valve and any decrease in pressure causes a lowering thereof to restrict the valve opening.

The wide open position of the valve is illustrated in Figure 2 wherein the flattened surfaces of the rotors or deformed cylinders are substantially parallel to each other to give an opening about 8 inches by 48 inches or 3840 square inches. The normal initial position of the valve is illustrated in Figure 3 wherein downward movement of rod 49 has restricted the opening to about 2 to 4 inches. It will be noted that in this position the upflowing fluid stream does not pass over any sharp edges but, on the contrary, flows smoothly between rounded surfaces into a zone of gradually expanding cross-sectional area which tends to smooth the flow and prevent the high turbulence and eddy currents which might otherwise cause erosion. The smooth flow over rounded surfaces minimizes and in some cases may eliminate the noise problem. The smooth flow and avoidance of back-lash at the upper part of the valve likewise minimizes erosion.

Some erosion however will inevitably take place at the throat opening and the lower portions of the rotors or deformed cylinders will be partially worn away. The increased thickness of the rotors at their lower edges makes provision for such erosion and the automatic control continues to function in spite of said erosion because any increase in opening size tends to decrease the pressure drop which, in turn, automatically lowers rod 49 and causes rotation of the rotors to such an extent as to provide the opening of required size. As more and more of the metal is worn away from the deformed cylinders the normal operating position of rod 49 and cross-arm 48 is correspondingly lower, the ultimate positioning being indicated in Figure 4 wherein the piston rod is in its lowest position, the total vertical travel length thereof being 24 inches. The valve hereinabove described thus continues to function in a satisfactory manner regardless of enormous amounts of erosion so that this valve will not be the weak spot in the catalytic cracking unit and will always continue to function as long as the unit is on stream.

During shut-downs for other purposes the valves may be inspected and repaired or replaced by simply withdrawing shaft 28 and the corresponding shaft through rotor 20 and removing the rotors either downwardly through opening 17 or upwardly through the top of the vent pipe or staff.

An important feature of the valve structure hereinabove described is a provision of sealing means for the back side and ends of the rotors. Arcuate plates 18 conform to the true cylindrical shape of the back side of the rotors. In order to prevent any binding of the rotors the arcuate plates are usually spaced from the rotors by about $\frac{1}{16}$ to $\frac{1}{4}$ of an inch so that a fluid can actually pass through the sealing space and keep it free from any accumulation of solids. Similarly, end plates 33 are spaced at a like distance from the ends of the rotors of the space between these end plates and the rotors is kept free from solids by a constant flow of bleed gas introduced through connection 38 to the space between pipe 37 and shaft 28. Thus there is no sliding friction between moving metallic parts which is so detrimental in systems for handling finely divided solids.

The seals as hereinabove described and particularly the seals between seal plates 18 and cylindrical surfaces on rotors 19 and 20 are not in this case entirely gas tight but the amount of gas which passes through this seal space is substantially constant and so small in magnitude as to be of no practical importance. The arcuate seal plates 18 should subtend an angle of at least about 60 degrees but less than 180 degrees, the preferable arcuate length being in the range of 90 to 150° or about 120°.

When the angle between the flattened surfaces is zero, i. e. surfaces are parallel, the width of the opening is 8 inches. When it is about 15 degrees the width is about 4 inches. When it is about 30 degrees the width is only about 1¾ inches. Thus by increasing the angle between the flattened surfaces the opening may be reduced to practically zero, i. e. the cylindrical surfaces contact each other. With extended use the lower part of the valve throat may be somewhat eroded away but the opening can be maintained constant by slight rotation of the cylinders.

While a specific example of the invention has been described in minute detail it should be understood that the invention is not limited to this particular example. When handling finely divided solids in fluids at relatively low temperatures the rotors or deformed cylinders may be of rubber which in some cases is even more resistant to erosion than steel. The materials of construction will be dependent of course upon the type of fluids to be handled and the conditions under which the valve has been designed to operate. In some cases the true cylindrical surface of the rotors may actually bear against the arcuate seal plates and a suitable lubricant may be employed therebetween. In the example hereinabove described, a bleed gas may be introduced at midpoints along the arcuate surface into the seal space between the arcuate bleeds and the cylinders so that such bleed gas will prevent any solids from entering said seal space. Many other modifications and alternative structural arrangements will be apparent from the above description to those skilled in the art.

Also other sound-absorbing and/or deadening means may be employed in place of horizontal perforated plates (exemplified by plate 13) or ferrule assemblies (exemplified by plate 24 and ferrules 25).

I claim:

1. A system for throttling the flow of fluids containing abrasive solids, which system comprises a pipe section flanged at one end, a base plate secured to said flange and provided with a central opening, arcuate plates secured to the upper side of the base plate on each side of the opening, end plates secured to the upper side of the base plate at each end of the opening between the ends of the arcuate plates, an upper pipe section above the base plate, inclined walls leading from the upper parts of the arcuate plates and the end plates respectively to the inner walls of the upper pipe section, a pair of rotatable shafts extending through said end plates, each shaft being concentric with one of said arcuate plates, a rotor keyed to each shaft, each rotor being cylindrical on one side and segmented on another side with its cylindrical portion concentric with its respective arcuate plate and spaced at a slight distance therefrom and the ends of each rotor being likewise spaced from the end plates at a slight distance therefrom, a fluid inlet for introducing a sealing fluid into the space between the rotor and adjacent metal surfaces and driving mechanism for rotating said shafts in opposite directions so that a substantially constant opening may be maintained between the opposed segmented surfaces of the rotors by rotating said rotors when portions thereof are worn away by erosion.

2. The system of claim 1 wherein the rotors are hollow with wear resistance walls of varying thickness and wherein the wear resistance walls are thicker at the portion where erosion is encountered than in portions wherein erosion is not encountered.

3. The system of claim 1 which includes a high temperature cement lining on the inner side of the first named pipe section, on the inclined walls and on the inner side of the upper pipe section above said inclined walls.

4. The system of claim 1 wherein each shaft is provided with a thrust groove for avoiding lateral movement of the rotors and which includes anti-friction bearing supports for each shaft.

5. The system of claim 1 which includes a perforated distributor plate in the first named pipe section below said base plate.

6. The system of claim 1 which includes an upper plate containing a multitude of openings mounted in the upper pipe section above the upper end of said inclined walls.

7. The system of claim 6 wherein replaceable ferrules are mounted in the openings in the upper plate.

DELMER G. DEBO.

REFERENCES CITED

The following references are of record in the file of this patent:

UNITED STATES PATENTS

| Number | Name | Date |
|---|---|---|
| 311,720 | Callahan | Feb. 3, 1885 |
| 735,074 | Edwards | Aug. 4, 1903 |
| 1,161,437 | Beamer | Nov. 23, 1915 |
| 1,170,046 | Carleton | Feb. 1, 1916 |
| 1,609,586 | Thewes | Dec. 7, 1926 |
| 1,652,054 | Schlagenhauff | Dec. 6, 1927 |
| 2,315,058 | Holt | Mar. 30, 1943 |
| 2,364,907 | Mattimore | Dec. 12, 1944 |
| 2,440,946 | Hansen | May 4, 1948 |

FOREIGN PATENTS

| Number | Country | Date |
|---|---|---|
| 274,135 | Italy | May 12, 1930 |